United States Patent
Formato et al.

(10) Patent No.: US 9,556,373 B2
(45) Date of Patent: Jan. 31, 2017

(54) GEL COMPRISING A PHASE-CHANGE MATERIAL, METHOD OF PREPARING THE GEL, AND THERMAL EXCHANGE IMPLEMENT COMPRISING THE GEL

(71) Applicant: Cold Chain Technologies, Inc., Holliston, MA (US)

(72) Inventors: Richard M. Formato, Grafton, MA (US); Dimitrios P. Bakllas, Worcester, MA (US)

(73) Assignee: COLD CHAIN TECHNOLOGIES, INC., Holliston, MA (US)

( * ) Notice: Subject to any disclaimer, the term of this patent is extended or adjusted under 35 U.S.C. 154(b) by 0 days.

(21) Appl. No.: 14/036,497

(22) Filed: Sep. 25, 2013

(65) Prior Publication Data
US 2014/0087105 A1    Mar. 27, 2014

Related U.S. Application Data (60) Provisional application No. 61/705,293, filed on Sep. 25, 2012.

(51) Int. Cl.
*C08K 5/01*    (2006.01)
*C08L 9/06*    (2006.01)
(Continued)

(52) U.S. Cl.
CPC .............. *C09K 5/06* (2013.01); *C09K 5/063* (2013.01); *C08K 5/01* (2013.01); *C08L 9/00* (2013.01);
(Continued)

(58) Field of Classification Search
CPC .............. C08K 5/01; C08L 9/06; C08L 9/00; C08L 15/00
(Continued)

(56) References Cited

U.S. PATENT DOCUMENTS 3,424,733 A    1/1969    Pollock
4,764,535 A    8/1988    Leicht
(Continued)

FOREIGN PATENT DOCUMENTS

CN    101423749 A  * 11/2007    ............... C09K 5/06
EP    1329433 A1    7/2003
(Continued)

OTHER PUBLICATIONS

Lyut et al., "Phase change materials formed by uv curable epoxy matrix and Fischer-Tropsch paraffin wax," Energy Conversion and Management, 50: 57-61 (2009).

(Continued)

*Primary Examiner* — Rip A Lee
(74) *Attorney, Agent, or Firm* — Kriegsman & Kriegsman (57) ABSTRACT

Gel including a phase-change material and a gelling agent. In one embodiment, the phase-change material may be n-tetradecane, and the gelling agent may be a styrene-ethylene-butylene-styrene (SEBS) triblock copolymer. In particular, the SEBS copolymer may be a high molecular weight SEBS copolymer with a styrene:rubber ratio of about 30:70 to 33:67% by weight. The SEBS copolymer may constitute up to about 10%, by weight, of the gel, preferably less than 6%, by weight, of the gel, with n-tetradecane constituting the remainder. To form the gel, the phase-change material and the gelling agent are mixed together at an elevated temperature relative to room temperature to partially, but not completely, dissolve the gelling agent, i.e., a homogeneous solution is not formed. The mixture is then allowed to cool to room temperature. The invention is also directed at a method of preparing the gel and a thermal exchange implement including the gel.

15 Claims, 5 Drawing Sheets (51) Int. Cl.
*C08L 15/00* (2006.01)
*C09K 5/06* (2006.01)
*C08L 9/00* (2006.01)

(52) U.S. Cl.
CPC ...... *C08L 9/06* (2013.01); *C08L 15/00* (2013.01); *Y02E 60/147* (2013.01); *Y10T 428/1334* (2015.01)

(58) Field of Classification Search
USPC ........ 524/487, 490, 474, 574, 571, 575, 476
See application file for complete search history.

(56) References Cited

U.S. PATENT DOCUMENTS

| | | | |
|---|---|---|---|
| 4,797,160 A | 1/1989 | Salyer | |
| 4,822,653 A | 4/1989 | Kauffman et al. | |
| 5,026,787 A | 6/1991 | Takagi et al. | |
| 5,112,900 A | 5/1992 | Buddenhagen | |
| 5,390,791 A | 2/1995 | Yeager | |
| RE34,880 E | 3/1995 | Salyer | |
| 5,508,334 A | 4/1996 | Chen | |
| 5,618,882 A * | 4/1997 | Hammond et al. | 525/92 D |
| 5,718,835 A * | 2/1998 | Momose et al. | 252/73 |
| 5,770,295 A | 6/1998 | Alderman | |
| 5,994,450 A | 11/1999 | Pearce | |
| 6,271,283 B1 | 8/2001 | Shimada et al. | |
| 6,340,467 B1 * | 1/2002 | Morrison | 424/405 |
| 6,413,458 B1 | 7/2002 | Pearce | |
| 6,433,068 B1 * | 8/2002 | Morrison et al. | 524/505 |
| 6,517,648 B1 | 2/2003 | Bouchette et al. | |
| 6,574,971 B2 | 6/2003 | Suppes | |
| 6,723,776 B2 * | 4/2004 | Sakaki et al. | 524/474 |
| 6,869,441 B2 | 3/2005 | Agarwal et al. | |
| 6,881,776 B2 * | 4/2005 | Butuc | 524/284 |
| 7,105,104 B2 | 9/2006 | Chomard et al. | |
| 7,138,079 B2 | 11/2006 | Pearce | |
| 7,294,374 B2 | 11/2007 | Romero | |
| 7,320,770 B2 * | 1/2008 | Chomard | B01J 13/0065 252/70 |
| 7,550,534 B2 * | 6/2009 | Zhao et al. | 525/88 |
| 7,625,967 B2 | 12/2009 | St. Clair | |
| 7,714,081 B2 | 5/2010 | Sera et al. | |
| 7,771,633 B2 | 8/2010 | Burns et al. | |
| 7,829,073 B2 | 11/2010 | Martin et al. | |
| 7,919,163 B2 | 4/2011 | Romero | |
| 7,964,664 B2 | 6/2011 | Pearce | |
| 7,994,256 B2 | 8/2011 | St. Clair | |
| 8,618,205 B2 * | 12/2013 | Shimakage et al. | 524/487 |
| 2002/0049276 A1 | 4/2002 | Zwick | |
| 2004/0072949 A1 | 4/2004 | Ding et al. | |
| 2004/0076826 A1 | 4/2004 | Lee | |
| 2005/0004274 A1 | 1/2005 | Healy et al. | |
| 2006/0124892 A1 * | 6/2006 | Rolland et al. | 252/70 |
| 2007/0000484 A1 * | 1/2007 | Magill et al. | 126/263.02 |
| 2007/0238835 A1 | 10/2007 | Chen | |
| 2008/0168595 A1 | 7/2008 | Almqvist | |
| 2008/0203105 A1 * | 8/2008 | Trotman et al. | 220/737 |
| 2009/0232753 A1 | 9/2009 | Healy et al. | |
| 2011/0124784 A1 | 5/2011 | Kross | |
| 2011/0243985 A1 | 10/2011 | Pagani et al. | |
| 2011/0248208 A1 | 10/2011 | Rolland et al. | |
| 2011/0281485 A1 | 11/2011 | Rolland et al. | |
| 2012/0100089 A1 | 4/2012 | Barba et al. | |
| 2012/0208959 A1 | 8/2012 | Mueller et al. | |
| 2014/0290285 A1 | 10/2014 | Formato et al. | |

FOREIGN PATENT DOCUMENTS

| | | | | |
|---|---|---|---|---|
| EP | 1838802 A2 | 10/2007 | | |
| EP | 2181694 A1 | 5/2010 | | |
| EP | 2261297 A2 | 12/2010 | | |
| KR | 930009901 B1 | 10/1993 | | |
| KR | 20030041891 A | 5/2003 | | |
| WO | 9105014 A1 | 4/1991 | | |
| WO | 0122779 A1 | 3/2001 | | |
| WO | 03057795 A1 | 7/2003 | | |
| WO | 2007040395 A1 | 4/2007 | | |
| WO | WO 2011/078340 A1 * | 6/2011 | | C08L 91/08 |
| WO | 2011094094 A1 | 8/2011 | | |

OTHER PUBLICATIONS

International Search Report dated Apr. 15, 2014 in PCT/US2013/061614.

Machida et al., "Aggregation Behavior of the Styrene Units in Oil Gel of Styrene-Butadiene-Styrene Triblock Copolymer," Nihon Reoroji Gakkaishi, 37(1):25-29 (2009).

Watanabe et al., "Rheology of Styrene-Butadiene-Styrene Triblock Copolymer in n-Tetradecane Systems," Journal of Rheology, 28(4):393-409 (1984).

KRATON Styrenic Block Copolymers in Oil Gels Fact Sheet, Kraton Perfomance Polymers, Inc., Houston, TX (2000).

Abstract of Xiao et al., "Preparation and performance of shape stabilized phase change thermal storage materials with high thermal conductivity," Energy Conversion and Management, 43(1):103-8 (2002).

Abstract of Royon et al., "Investigation on heat transfer properties of slurry of stabilized paraffin during a melting process," Energy Conversion and Management, 52(2):1073-6 (2011).

Abstract of Chantawansri et al., "Phase behavior of SEBS triblock copolymer gels," Journal of Polymer Science Part B: Polymer Physics, 49(20):1479-91 (2011).

Abstract of Kim et al., "Influence of Hydrocarbon Oils on the Physical Gelation of Poly(styrene-b-(ethylene-co-butylene)-b-styrene) (SEBS) Triblock Copolymers," Journal of Elastomers and Plastics, 39(2):133-50 (2007).

Abstract of Sato et al., "Thermoreversible Physical Gelation of Block Copolymers in a Selective Solvent," Macromolecules, 33(5):1686-91 (2000).

Abstract of Zhang et al., "Silica encapsulation of n-octadecane via sol-gel process: a microencapsulated phase-change material with enhanced conductivity and performance," Journal of Colloid and Interface Science, 343(1)246-55 (2010).

Sharma et al., "Review on thermal energy storage with phase change materials and applications," Renewable and Sustainable Energy Reviews, 13:318-45 (2009).

PlusICE High Loading Organic Rubber Development, www.pcmproducts.net, Phase Change Material Products Limited, Cambridgeshire, UK (2012).

International Search Report mailed Jun. 15, 2015, from PCT Appln. No. PCT/US15/22626 (the corresponding PCT application to U.S. Appl. No. 14/225,589).

* cited by examiner

GEL COMPRISING A PHASE-CHANGE MATERIAL, METHOD OF PREPARING THE GEL, AND THERMAL EXCHANGE IMPLEMENT COMPRISING THE GEL

BACKGROUND OF THE INVENTION

The present invention relates generally to phase-change materials and relates more particularly to a novel gel comprising a phase-change material, to a method of preparing the gel, and to a thermal exchange implement comprising the gel.

It is often desirable to store and/or to transport temperature-sensitive materials, examples of such temperature-sensitive materials including, but not being limited to, pharmaceuticals, biological samples, foods, and beverages. Packaging systems for storing and/or transporting such materials typically include some means for maintaining the temperature-sensitive materials within a desired temperature range. In many instances, the means for maintaining the temperature-sensitive material within a desired temperature range includes positioning a phase-change material within the storage system in proximity to the temperature-sensitive material. Typically, the phase-change material is selected such that it has a phase change temperature that is within the desired temperature range for the temperature-sensitive material in question. A common phase-change material is water, which is typically thickened or incorporated into some form of a gel for the above-described type of application. Other common phase-change materials include organic compounds, such as n-alkanes (e.g., n-tetradecane, n-hexadecane, and n-octadecane), fatty acid esters (e.g., methyl esters, such as lauric acid methyl ester (also known as methyl laurate) and myristic acid methyl ester (also known as methyl myristate)), fatty alcohols (e.g., decyl alcohol (also known as 1-decanol) and dodecyl alcohol (also known as 1-dodecanol)), and fatty acids (e.g., ricinoleic acid and caprylic acid).

Because phase change materials are designed to be changeable to or from a fluid state, such phase change materials are typically encased within some form of closed container. An example of one common type of closed container is a flexible pouch, and an example of another common type of closed container is a rigid bottle.

One problem that has been encountered, particularly with organic phase-change materials like n-tetradecane is that, because such phase-change materials have very low surface tension, if there is a defect, such as a hole, in the container holding the phase-change material, the phase-change material tends to pass very easily through the defect and subsequently flows near or onto the temperature-sensitive material. As can readily be appreciated, the passage of the phase-change material through such a defect is undesirable. Moreover, in those instances where the container or portions thereof are permeable to the phase-change material (such as where the phase-change material is n-tetradecane and the container for the phase-change material is a polyethylene bottle or a pouch having polyethylene seals), the phase-change material has a tendency, over time, to permeate through the container. Consequently, the phase-change material may "leak" from the container even in the absence of a defect in the container.

Documents of interest may include the following, all of which are incorporated herein by reference: U.S. Pat. No. 7,964,664 B2, inventor Pearce, issued Jun. 21, 2011; U.S. Pat. No. 7,919,163 B2, inventor Romero, issued Apr. 5, 2011; U.S. Pat. No. 7,714,081 B2, inventors Sera et al., issued May 11, 2010; U.S. Pat. No. 7,625,967 B2, inventor St. Clair, issued Dec. 1, 2009; U.S. Pat. No. 7,320,770 B2, inventors Chomard et al., issued Jan. 22, 2008; U.S. Pat. No. 7,294,374 B2, inventor Romero, issued Nov. 13, 2007; U.S. Pat. No. 7,105,104 B2, inventors Chomard et al., issued Sep. 12, 2006; U.S. Pat. No. 6,574,971 B2, inventor Suppes, issued Jun. 10, 2003; U.S. Pat. No. 6,340,467 B1, inventor Morrison, issued Jan. 22, 2002; U.S. Pat. No. 5,994,450; inventor Pearce, issued Nov. 30, 1999; U.S. Pat. No. 5,718,835, inventors Momose et al., issued Feb. 17, 1998; U.S. Patent No. 5,508,334, inventor Chen, issued Apr. 16, 1996; U.S. Pat. No. 5,390,791, inventor Yeager, issued Feb. 21, 1995; U.S. Pat. No. 4,797,160, inventor Salyer, issued Jan. 10, 1989; U.S. Pat. No. RE 34,880, inventor Salyer, issued Mar. 21, 1995; U.S. Patent Application Publication No. US 2011/0281485 A1, inventors Rolland et al., published Nov. 17, 2011; U.S. Patent Application Publication No. US 2011/0248208 A1, inventors Rolland et al., published Oct. 13, 2011; PCT International Publication No. WO 2007/040395 A1, published Apr. 12, 2007; PCT International Publication No. WO 03/057795 A1, published Jul. 17, 2003; European Patent Application Publication No. EP 2,261,297 A2, published Dec. 15, 2010; and European Patent Application Publication No. EP 1,838,802 A2, published Oct. 3, 2007.

SUMMARY OF THE INVENTION

It is an object of the present invention to provide a novel gel comprising a phase-change material.

According to one aspect of the invention, a novel gel is provided, the gel comprising a phase-change material and a gelling agent, the gel being formed by mixing together the phase-change material and the gelling agent at a temperature above room temperature but below the flashpoint of the phase-change material to partially, but not completely, dissolve the gelling agent, whereby a non-homogeneous mixture is produced, and then allowing the non-homogeneous mixture to cool to room temperature.

According to a detailed feature of the invention, the phase-change material may be at least one organic phase-change material.

According to another detailed feature of the invention, the at least one organic phase-change material may be at least one compound selected from the group consisting of n-alkanes, fatty acid esters, fatty alcohols, and fatty acids.

According to another detailed feature of the invention, the at least one organic phase-change material may be selected from the group consisting of n-tetradecane, n-hexadecane, n-octadecane, and mixtures thereof.

According to another detailed feature of the invention, the at least one organic phase-change material may be n-tetradecane.

According to another detailed feature of the invention, the gelling agent may be at least one saturated olefin rubber.

According to another detailed feature of the invention, the gelling agent may be at least one hydrogenated styrenic block copolymer.

According to another detailed feature of the invention, the gelling agent may be at least one styrene-ethylene-butylene-styrene (SEBS) tri-block copolymer.

According to another detailed feature of the invention, the gelling agent may be at least one high molecular weight styrene-ethylene-butylene-styrene tri-block copolymer with a styrene:rubber ratio in the range of about 30:70 to 33:67% by weight.

According to another detailed feature of the invention, the phase-change material may be n-tetradecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the gelling agent may constitute up to about 10%, by weight, of the gel, preferably less than 6%, by weight, of the gel, with the phase-change material constituting the remainder of the gel.

According to another detailed feature of the invention, the temperature at which the phase-change material and the gelling agent are mixed together may be in the range of about 40° C. to about 55° C.

According to another detailed feature of the invention, the gelling agent may be at least one styrene-ethylene-propylene-styrene (SEPS) tri-block copolymer.

According to another detailed feature of the invention, the gelling agent may be at least one high molecular weight styrene-ethylene-propylene-styrene tri-block copolymer with a styrene:rubber ratio in the range of about 20:80% by weight.

For purposes of the present specification and claims, the term "high molecular weight," when used to characterize SEBS and/or SEPS copolymers, may be inferred by a Brookfield viscosity of at least 400 centipoise for a 10% by weight solution of [neat] polymer measured at 25° C. to 30° C.

It is another object of the present invention to provide a novel method of preparing a gel comprising a phase-change material.

According to one aspect of the invention, a novel method of preparing a gel is provided, the method comprising the steps of (a) providing a phase-change material; (b) providing a gelling agent; (c) mixing together the phase-change material and the gelling agent at a temperature above room temperature but below the flashpoint of the phase-change material to partially, but not completely, dissolve the gelling agent, whereby a non-homogeneous mixture is produced; and (d) allowing the non-homogeneous mixture to cool to room temperature.

According to a detailed feature of the invention, the phase-change material may be at least one organic phase-change material.

According to another detailed feature of the invention, the at least one organic phase-change material may be at least one compound selected from the group consisting of n-alkanes, fatty acid esters, fatty alcohols, and fatty acids.

According to another detailed feature of the invention, the at least one organic phase-change material may be selected from the group consisting of n-tetradecane, n-hexadecane, n-octadecane, and mixtures thereof.

According to another detailed feature of the invention, the at least one organic phase-change material may be n-tetradecane.

According to another detailed feature of the invention, the gelling agent may be at least one saturated olefin rubber.

According to another detailed feature of the invention, the gelling agent may be at least one hydrogenated styrenic block copolymer.

According to another detailed feature of the invention, the gelling agent may be at least one styrene-ethylene-butylene-styrene tri-block copolymer.

According to another detailed feature of the invention, the gelling agent may be at least one high molecular weight styrene-ethylene-butylene-styrene tri-block copolymer with a styrene:rubber ratio in the range of about 30:70 to 33:67% by weight.

According to another detailed feature of the invention, the phase-change material may be n-tetradecane, and the gelling agent may be a high molecular weight styrene-ethylene-butylene-styrene tri-block copolymer with a styrene:rubber ratio in the range of about 30:70 to 33:67% by weight.

According to another detailed feature of the invention, the gelling agent may constitute up to about 10%, by weight, of the gel, preferably less than 6%, by weight, of the gel, with the phase-change material constituting the remainder of the gel.

According to another detailed feature of the invention, the temperature at which the phase-change material and the gelling agent are mixed together may be in the range of about 40° C. to about 55° C.

According to another detailed feature of the invention, the gelling agent may be at least one styrene-ethylene-propylene-styrene tri-block copolymer.

According to another detailed feature of the invention, the gelling agent may be at least one high molecular weight styrene-ethylene-propylene-styrene tri-block copolymer with a styrene:rubber ratio in the range of about 20:80% by weight.

It is still another object to provide a novel thermal exchange implement.

According to one aspect of the invention, a novel thermal exchange implement is provided, the thermal exchange implement comprising the above-described gel and a container holding a quantity of the gel.

According to a detailed feature of the invention, the container may be a flexible pouch.

According to another detailed feature of the invention, the container may be a rigid bottle.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF THE INVENTION

The present invention is directed, in part, at a gel comprising a phase-change material (PCM) and a gelling agent. The present invention is also directed, in part, at a method of preparing the aforementioned gel. The present invention is additionally directed, in part, at a thermal exchange implement comprising the combination of the aforementioned gel and a container holding a quantity of the gel.

The phase-change material of the present invention may include, but is not limited to, one or more organic phase-change materials. The one or more organic phase-change materials may include, but are not limited to, one or more of the following: n-alkanes, such as, but not limited to, n-tetradecane (n-TD), n-hexadecane (n-HD), n-octadecane (n-OD), etc., as well as mixtures thereof (e.g., mixtures of n-tetradecane and n-hexadecane, mixtures of n-hexadecane and n-octadecane, etc.); fatty acid esters, such as, but not limited to, methyl esters, which may include lauric acid methyl ester (i.e., methyl laurate), myristic acid methyl ester (i.e., methyl myristate), and mixtures thereof; fatty alcohols, such as, but not limited to, decyl alcohol (i.e., 1-decanol), dodecyl alcohol (i.e., 1-dodecanol), and mixtures thereof; and fatty acids, such as, but not limited to, ricinoleic acid, caprylic acid, and mixtures thereof.

Where, for example, the phase-change material is a mixture of two or more n-alkanes selected from the group consisting of n-tetradecane, n-hexadecane, and n-octadecane, the relative proportions of the two or more n-alkanes of the mixture may be adjusted in order to modify the phase change temperature of the mixture. For example, by selecting appropriate relative proportions of n-tetradecane, n-hexadecane, and/or n-octadecane, one can tailor the phase change temperature of a mixture thereof to a desired phase change temperature lying within a range of about 2° C. to 28° C. or, more specifically, lying within a range of about 2° C. to 8° C. or within a range of about 15° C. to 28° C.

The gelling agent of the present invention may include, but is not limited to, one of the following or combinations of the following: organic gelling agents; organometallic gelling agents, such as, but not limited to, alkaline or alkaline earth soaps; and inorganic gelling agents, such as, but not limited to, fumed silica (hydrophobic and hydrophilic) and bentonite clay with and without a polar activator. Of the aforementioned gelling agents, organic gelling agents are preferred. The aforementioned organic gelling agents may include, for example, polyamide-polyether copolymers and saturated olefin rubbers, with the latter being preferred. Examples of such saturated olefin rubbers may include hydrogenated styrenic block copolymers (HSBC), such as, but not limited to, the copolymers commercially available from Kraton Polymers LLC (Houston, Tex.) as the Kraton G, SEBS/SEP, EP and ERS families of copolymers, as well as the copolymers commercially available from Kuraray America, Inc. (Houston, Tex.) as the SEPTON SEP, SEPS, SEBS and SEEPS families of copolymers.

The aforementioned Kraton G copolymers are thermoplastic elastomers having copolymer chains in a di-block, tri-block, or multi-arm configuration. The tri-block copolymers have styrene (S) on both ends of the chain and a rubber (e.g., ethylene propylene (EP) or ethylene butylene (EB)) in the middle whereas the di-block structure has styrene on only one end of the chain. For the tri-block structures, it is known that the rubber segments form separate domains and that the styrene segments lock together to form physical cross links. The key properties to consider, in developing gels using SEBS and SEPS copolymers, include styrene content, molecular weight, tri-block vs. di-block, and end-use temperature. For a given concentration of copolymer, flow resistance is increased by increasing styrene content, increasing molecular weight, using tri-block structures and using lower temperatures.

In accordance with the present invention, a gel comprising a phase-change material and a gelling agent preferably possesses one or more of the following properties:

Amount of Gelling Agent: The gelling agent is preferably commercially available in a form that allows ease of use in manufacturing. The amount of gelling agent used should be similar to (or below) typical refrigerant weight tolerances (e.g. up to about 10% by weight of the gel, preferably less than 6% by weight of the gel). Furthermore, minimizing the amount of gelling agent used is important in maximizing the latent heat (energy absorbed or released during phase change) of the resulting gel.

Gel Freeze/Thaw cycling: The gel preferably passes multiple freeze/thaw testing (n=10 cycles, +15° C. for 6 hrs, −5° C. for 6 hrs) such that no separation is seen during the test or after it is complete. This is important since, as typically used, refrigerants can go through several freeze/thaw cycles before being used and/or may be used multiple times.

Gel Performance: The gelling agent should not react with the phase-change material. In addition, the gel should have performance equal to or exceeding conventional polyacrylic acid/water-based gels in terms of leakage.

Gel Processing: Preparation at standard plant operating temperatures (15° C. to 30° C.) is preferred; heating (up to flash point of PCM, for n-tetradecane=+99° C.) may be acceptable. In addition, the gel should be able to be incorporated into its container (gel pack, saddlebag, bottle, mat, etc.) using standard vertical form/fill/seal (VFFS) equipment and/or bottle filling machinery (i.e., gel must be pump-able).

Gel Operating Temperature: The gel should meet its performance requirements at typical exposure temperatures from −20° C. to +40° C. Specifically, the gel should pass the "upside down" test (inverted in container without any flow) over this temperature range.

Gel Freeze Point Depression: Freeze point depression must be minimized. For a 5° C. phase-change material, for example, the gel freeze point should not go below 3° C.

Gel Shear Thinning: When the gel is shaken vigorously, shear thinning is okay, but preferably the viscosity recovers quickly (<5 minutes).

The present inventors believe that one can obtain a gel possessing one or more, and preferably all, of the above properties for a given phase-change material by selecting an appropriate gelling agent, such as an SEBS or SEPS triblock copolymer having a particular styrene/rubber ratio or molecular weight, and/or by adjusting mixing conditions (e.g., temperature or mixing speed) and/or by adjusting the relative proportions of phase-change material and gelling agent.

A gel possessing many or all of the above properties may comprise one or more n-alkanes, such as, but not limited to, n-tetradecane, n-hexadecane, n-octadecane, or mixtures thereof, as the phase-change material and may comprise an SEBS copolymer, such as, but not limited to, Kraton™ G1651 copolymer (a high molecular weight SEBS tri-block copolymer with a styrene:rubber ratio of 30:70% by weight), Kraton™ G1654 copolymer (a high molecular weight SEBS tri-block copolymer with a styrene:rubber ratio of 33:67% by weight), or Kraton™ G1660 copolymer (an SEBS tri-block copolymer with a styrene:rubber ratio of 31:69% by weight), or an SEPS copolymer, such as, but not limited to, SEPTON™ S2005 copolymer (a high molecular weight SEPS tri-block copolymer with a styrene:rubber ratio of 20:80% by weight), as the gelling agent. In particular, where n-tetradecane is the phase-change material, and where an SEBS tri-block copolymer like Kraton™ G1651 copolymer, Kraton™ G1654 copolymer, or Kraton™ G1660 copolymer or an SEPS tri-block copolymer like SEPTON™ S2005 copolymer is used as the gelling agent, the gelling agent preferably constitutes up to about 10%, by weight, of the gel, more preferably less than 6%, by weight, of the gel, with the balance of the gel being n-tetradecane.

Moreover, according to an important aspect of the invention, such a gel is preferably prepared by mixing together the phase-change material and the gelling agent at an "intermediate temperature" that is below the flashpoint of the phase-change material and that is elevated relative to room temperature but that is not so elevated that the gelling agent completely dissolves in the phase-change material. In other words, the gelling agent preferably only partially dissolves in the phase-change material, whereby a homogeneous solution does not form. For the Kraton™ G1651 copolymer, the intermediate temperature has been determined to be in the 55° C. range, for the Kraton™ G1654 copolymer, the intermediate temperature has been determined to be in the 40° C. range, for the Kraton™ G1660 copolymer, the intermediate temperature has been determined to be in the 42° C. range, and for the SEPTON™ S2005 copolymer, the intermediate temperature has been determined to be in the 40° C. range. Such a mixture is then allowed to cool to room temperature.

Without wishing to be limited to any particular theory behind the invention, it is believed that the SEBS or SEPS material partially dissolves and partially swells in the phase change material, such as n-tetradecane. The dissolution is likely based on the rubber (EB or EP) portion of the copolymer, and the swelling is likely based on the styrene (S) portion of the copolymer. If the temperature is increased too much (e.g. 90° C. or more), a completely clear, homogenous solution results, consisting of both S and EB or S and EP micro-domains, which is highly undesirable. It is, therefore, very important that a homogenous solution not form. Without being bound by theory, it is hypothesized that the styrene (S) portion of the copolymer, when swollen, can still cross-link to allow some gel structural integrity. The rubber (EB or EP) micro-domains ($T_g$ below −50° C.) give the gel its low temperature flexibility. At some (minimum) critical concentration (higher than the 90° C. dissolution concentration), the (SEBS or SEPS)/n-tetradecane mixture forms a cohesive gel with elastic properties.

Mixing may be achieved using an overhead stirrer with a "cowles" type disperser/mixer blade (tip speeds of 6 to 11 m/sec). Such an arrangement provides a good combination of top-to-bottom flow and shear in the mixing vessel.

Figure 1:
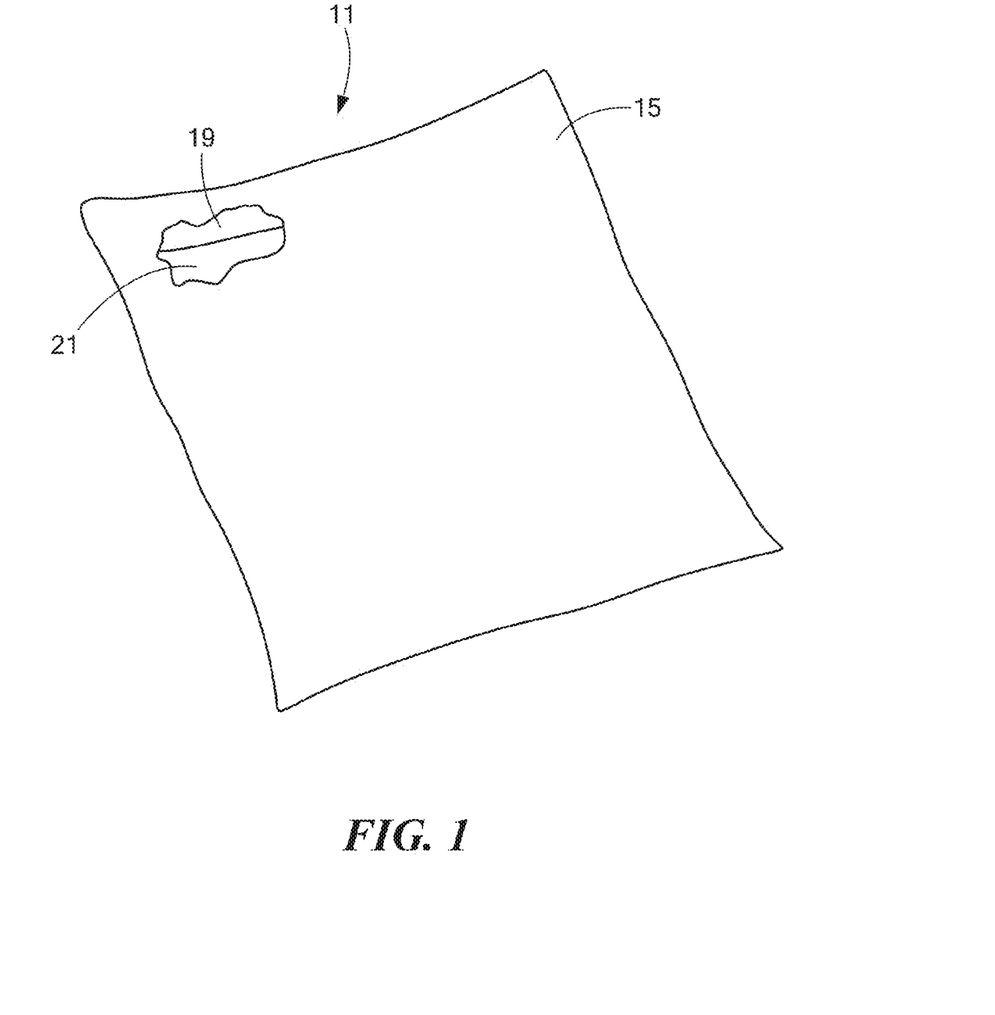
FIG. 1 is a front view, broken away in part, of a first embodiment of a thermal exchange implement for use in maintaining a temperature-sensitive material within a desired temperature range, the thermal exchange implement being constructed according to the teachings of the present invention.

Referring now to FIG. 1, there is shown a front view, broken away in part, of a first embodiment of a thermal exchange implement for use in maintaining a temperature-sensitive material within a desired temperature range, the thermal exchange implement being constructed according to the teachings of the present invention and being represented generally by reference numeral 11.

Thermal exchange implement 11 may comprise a sealed pouch 15. Pouch 15, which may be a flexible structure made by sealing together one or more laminate sheets each comprising an inner polyethylene layer and at least one outer barrier layer, may be shaped to define an interior cavity 19. A quantity of a gel 21, which may be, for example, a gel of the type described above that comprises at least one phase change material, such as n-tetradecane, and at least one gelling agent, such as an SEBS or SEPS copolymer, may be disposed within cavity 19.

Thermal exchange implement 11 may be used similarly to a conventional ice/cold pack to keep temperature-sensitive materials within a desired temperature range.

Figure 2:
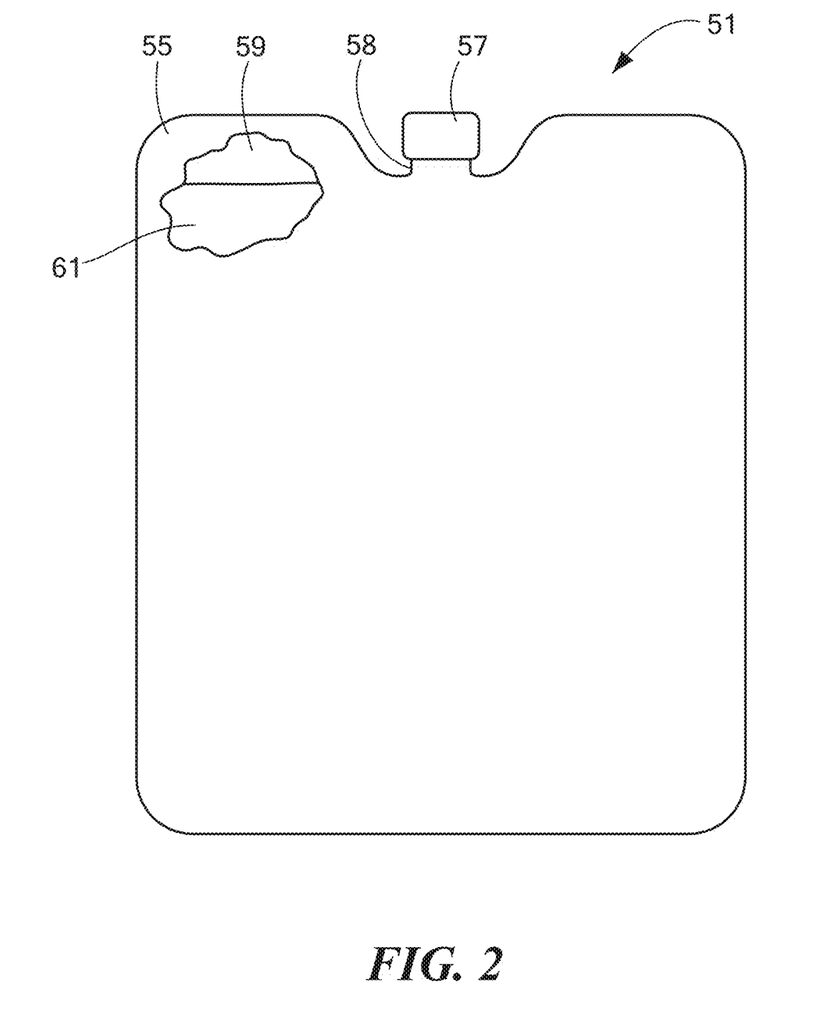
FIG. 2 is a front view, broken away in part, of a second embodiment of a thermal exchange implement for use in maintaining a temperature-sensitive material within a desired temperature range, the thermal exchange implement being constructed according to the teachings of the present invention.

Referring now to FIG. 2, there is shown a front view, broken away in part, of a second embodiment of a thermal exchange implement for use in maintaining a temperature-sensitive material within a desired temperature range, the thermal exchange device being constructed according to the teachings of the present invention and being represented generally by reference numeral 51.

Thermal exchange implement 51 may comprise a bottle 55 and a cap 57, cap 57 being securely mounted, for example, by screwing, on a neck 58 of bottle 55. Bottle 55, which may be a rigid structure molded from a polymer, such as polyethylene, may be shaped to define an interior cavity 59. A quantity of a gel 61, which may be, for example, a gel of the type described above that comprises at least one phase-change material, such as n-tetradecane, and at least one gelling agent, such as an SEBS or SEPS copolymer, may be disposed within cavity 59.

Thermal exchange implement 51 may be used similarly to thermal exchange implement 11 to keep temperature-sensitive materials within a desired temperature range.

The following examples are provided for illustrative purposes only and are in no way intended to limit the scope of the present invention:

EXAMPLE 1

Gel Comprising n-tetradecane and Kraton™ G1654 SEBS Triblock Copolymer

Materials and Equipment

N-tetradecane (n-TD, $C_{14}H_{30}$, CAS#629-59-4, density=0.77 g/cc, purity 98%+, F.P. 99° C.) was procured from a commercial supplier and was used as supplied. Kraton™ G1654 powder (triblock SEBS co-polymer w/hydrogenated ethylene/butylene midblock, styrene:rubber ratio of 33:67% by weight, density=0.91 g/cc) was procured from Kraton Polymers (Houston, Tex.) and was used as received.

Figure 3:
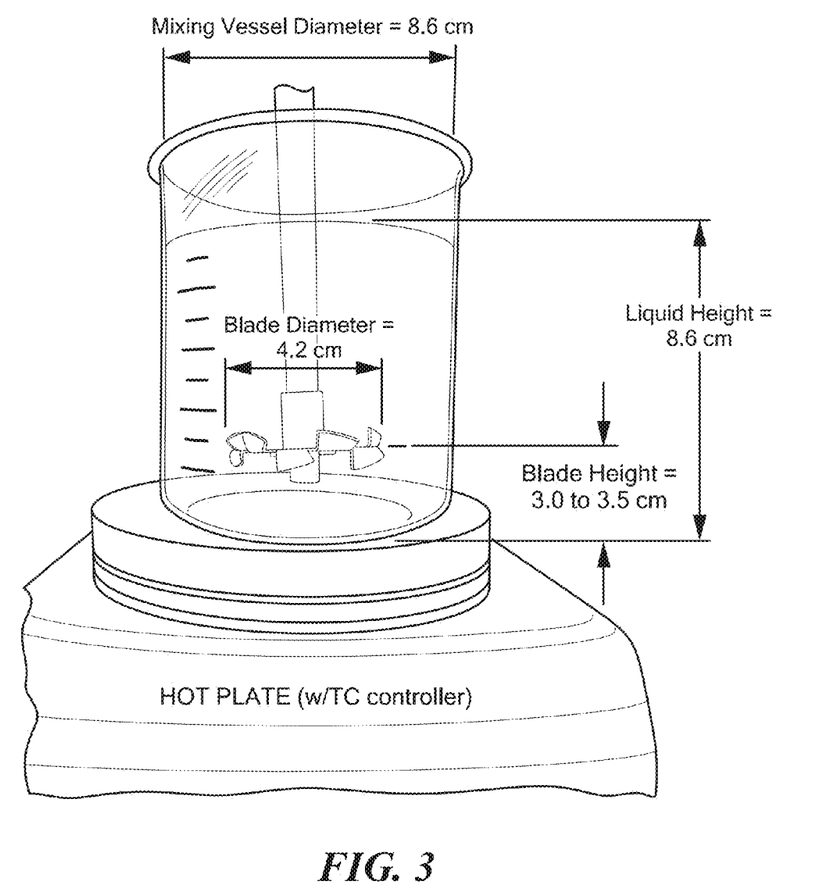
FIGS. 3 and 4 are front perspective and top perspective views, respectively, of the mixing setup used in Examples 1 through 4 and in Comparative Example 1.
Figure 4:
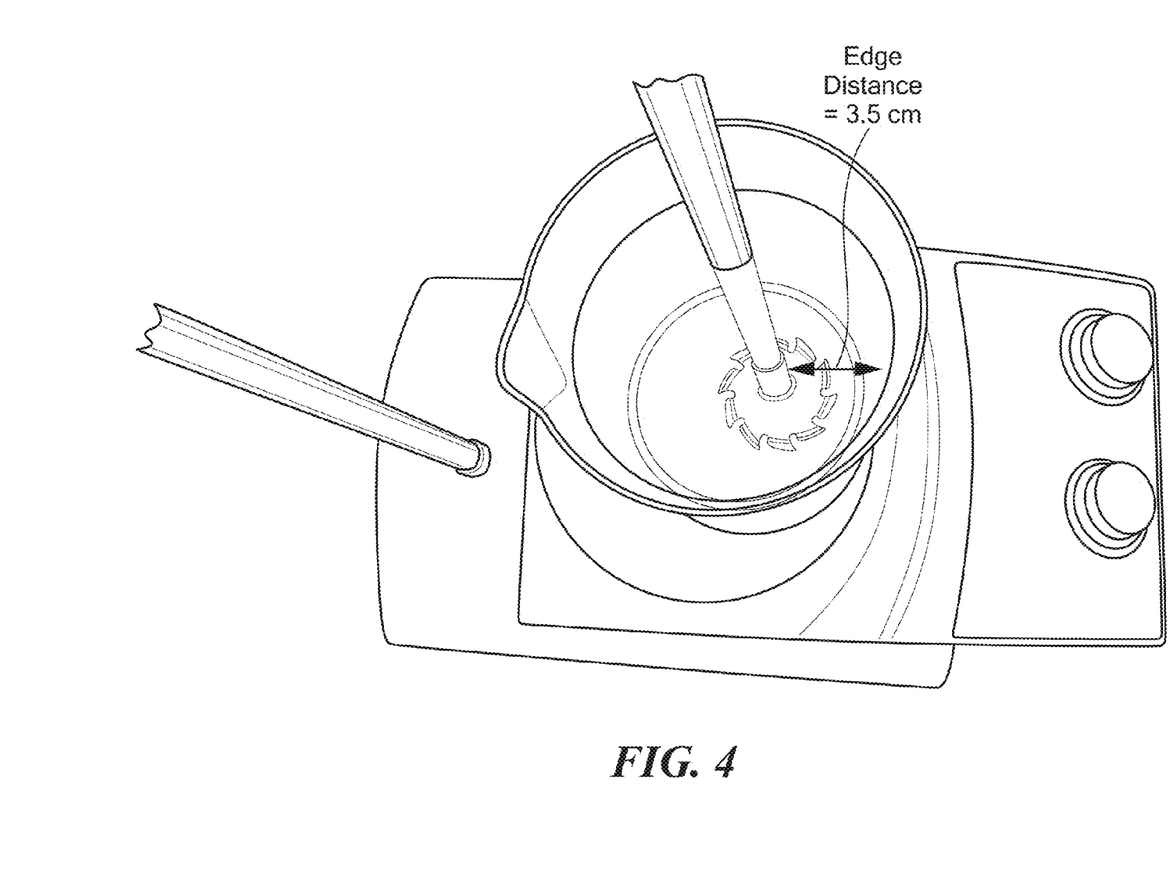

Multiple experiments were completed at laboratory scale to demonstrate proof of concept for the desired mixing system. The experimental laboratory setup is shown in FIGS. 3 and 4.

Description of Mixing Process

The mixing process was performed using an IKA RC hotplate with temperature feedback control loop, an IKA RW20 (overhead stirrer) mixer and an IKA R1303 (blade) stirrer.

The [500 ml] beaker was filled with approximately 360 grams (470 ml) of n-tetradecane (n-TD).

The IKA hot plate was set to +40° C. The control loop kept the temperature of the system at 40° C.±2° C. at all times.

The RW20 mixer was set to 1300 RPM (R1303 tip speed of ~5.7 meters/sec), while the n-TD liquid was heated.

Once at temperature, Kraton™ G1654 powder (amount=18 grams, or 5% wt of n-TD) was added into the vortex of the fluid, and the RW20 mixer was maintained at 1300 RPM for about 7 minutes.

As the viscosity began to increase, the RW20 mixer speed was increased to 2400 RPM (R1303 tip speed of 10.6 m/sec), gradually over a 2 minute time period. The RW 20 mix speed remained at 2400 RPM for an additional 10 minutes, until the viscosity was too high for flow to occur (>10,000+centipoise, based on RW20 capability).

At that time, both the RW20 mixer and the IKA hot plate were shut off.

Figure 5:
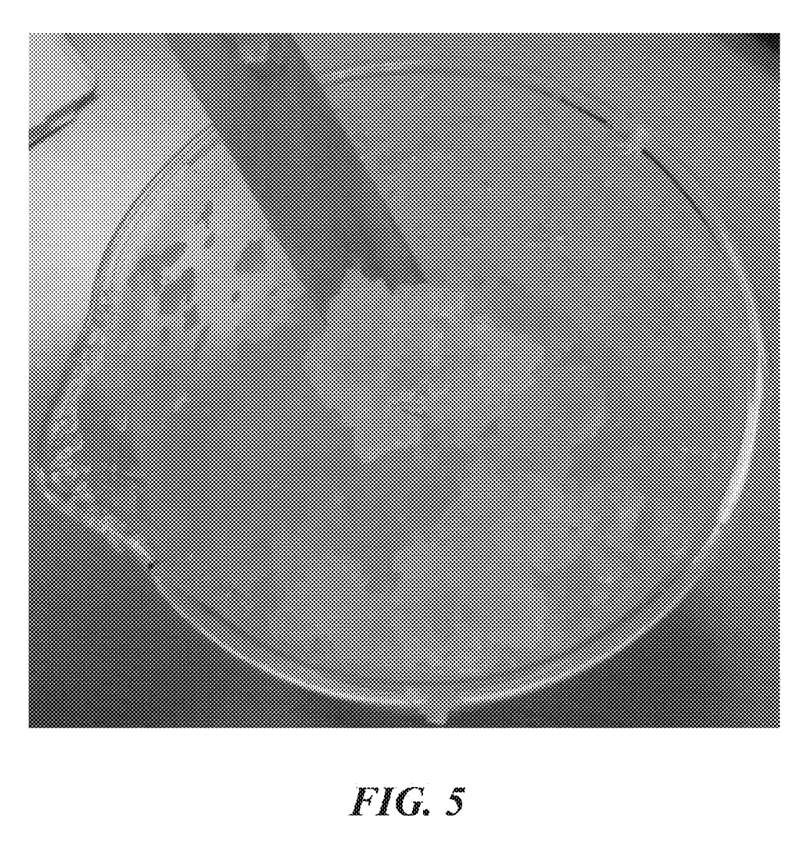
FIG. 5 is a photo of a quantity of the gel prepared in Example 1.

After cooling to room temperature, the mixture was stored for further analysis. A photograph of the resulting mixture is shown in FIG. 5. As can be seen in FIG. 5, the resulting mixture was not a clear, homogeneous solution.

EXAMPLE 2

Gel Comprising n-tetradecane and Kraton™ G1651 SEBS Triblock Copolymer

The same procedure as in Example 1 was used, except that (1) Kraton™ G1651 powder (triblock SEBS co-polymer w/hydrogenated ethylene/butylene midblock, styrene:rubber ratio of 30:70% by weight, density=0.91 g/cc) was used in place of Kraton™ G1654 powder, (2) the control loop kept the temperature of the system at 55° C.±1° C. at all times, and (3) the mix speed was varied until a gel of viscosity similar to that of Example 1 was obtained.

EXAMPLE 3

Gel Comprising n-tetradecane and Kraton™ G1660 SEBS Triblock Copolymer

The same procedure as in Example 1 was used, except that (1) Kraton™ G1660 powder (triblock SEBS co-polymer w/hydrogenated ethylene/butylene midblock, styrene:rubber ratio of 31:69% by weight, density=0.91 g/cc) was used in place of Kraton™ G1654 powder, (2) the control loop kept the temperature of the system at 42° C.±2° C. at all times, and (3) the mix speed was varied until a gel of viscosity similar to that of Example 1 was obtained.

EXAMPLE 4

Gel Comprising n-tetradecane and SEPTON™ S2005 SEPS Triblock Copolymer

The same procedure as in Example 1 was used, except that (1) SEPTON™ S2005 powder (triblock SEPS co-polymer w/hydrogenated ethylene/propylene midblock, styrene:rubber ratio of 20:80% by weight, density=0.89 g/cc) was used in place of Kraton™ G1654 powder, (2) the control loop kept the temperature of the system at 40° C.±1° C. at all times, and (3) the mix speed was varied over a 24 minute period, until a gel of viscosity similar to that of Example 1 was obtained.

EXAMPLE 5

Testing of Various Gels

Gels comprising Kraton™ G1654 SEBS and n-tetradecane that were made using methods similar to those described in Example 1 were evaluated for their use as phase-change materials. Tables 1, 2 and 3 below summarize the performance of these gels, which were prepared at different copolymer concentrations and mixing conditions, and also summarize the performance of samples that did not include a gelling agent.

TABLE 1

Freeze and Thaw Phase Change Temperature

| Sample Material/ Manufacturer | Thaw PCT [C.] | Freeze PCT [C.] |
| --- | --- | --- |
| 3% wt G1654 | 5.0 | 4.2 |
| 4% wt G1654 | 4.9 | 4.0 |
| 5% wt G1654 | 5.0 | 4.2 |
| Average: | 4.9 | 4.1 |
| 5% wt G1654 #1 | 5.6 | 4.2 |
| 5% wt G1654 #2 | 5.3 | 4.8 |
| 5% wt G1654 #3 | 5.7 | 3.9 |
| 5% wt G1654 #4 | 5.3 | 5.0 |
| Average: | 5.5 | 4.5 |
| Pure n-TD #1 | 5.6 | 5.0 |
| Pure n-TD #2 | 5.7 | 5.0 |
| Pure n-TD #3 | 5.6 | 5.1 |
| Pure n-TD #4 | 5.7 | 5.0 |
| Average: | 5.6 | 5.0 |

Table 1 shows the freeze/thaw temperature test results of the n-TD PCM gel. Table 2 shows how the PCM gel performed vs. a control (612A) gel pack, filled with a water-based, synthetic gel. Each gel pack tested was punctured with a specific hole size, and subjected to a load of 1.5 psi for 60 seconds. The gels were also evaluated for both free standing (liquid n-TD) and ability to pass the freeze/thaw test (no separation after 10 Freeze/Thaw cycles). Table 3 is a summary of DSC test results comparing the latent heat of the n-TD PCM gel to the parent (liquid only) n-TD used to make the gel. As is shown in Tables 1, 2 and 3, the 5% wt Kraton™ G1654/n-TD PCM met or exceeded the following criteria:

Amount of Gelling Agent: a copolymer concentration of 5% wt is feasible

Gel Freeze/Thaw cycling: Showed passing results at n=10(+) cycles

Gel Performance: Leakage performance exceeds synthetic water-based gels; the n-TD PCM gel retained approximately 95% of the original (parent liquid n-TD) latent heat.

Gel Processing: Preparation at +40° C. demonstrated, at short mix times (15 minutes)

Gel Operating Temperature: The gelled PCM remains unchanged during cycling from −20° C. to +40° C.

Gel Freeze Point Depression: The gelled PCM freeze/thaw points are within specification Gel Shear Thinning: The gel does not shear thin enough to markedly lower its viscosity

TABLE 2

| ID # | % wt thickener | Mixing Conditions | Hole size allowing 1% wt loss* | % wt. Loss (1.5 psi for 60 sec)* | Free (liquid) n-TD in sample? | Freeze/Thaw Test Result (10 cycles) |
|---|---|---|---|---|---|---|
| 1 | 0% | N/A | 31 mil | >30% | YES | Pass |
| 2 | 3% | 15 min, 40° C. | 40 mil | 5.7% | YES | Fail |
| 3 | 4% | 15 min, 40° C. | 60 mil | 1.50% | YES | Fail |
| 4a | 5%** | 4 hrs, 22° C. | 60 mil | 1.20% | YES | Fail |
| 4b | 5% | 5 min, 90° C. | NA | NA | NO*** | Fail |
| 5 | 5% | 5 min, 40° C. | 40 mil | ~2% | YES | Pass |
| 6 | 5% | 10 min, 40° C. | 40 mil | 1.0% | YES | Pass |
| 7 | 5% | 15 min, 40° C. | 81(+) mil | 0.5% | NO | Pass |
| 8 | Control [synthetic] | N/A | 60 mil | 3.6% | NO Free Liquid (H$_2$0) | Pass |

*612A Gel pack (6" × 5½" × 1") was exposed to ~1.5 psi for 60 sec
**This mixture had 30-40% liquid n-TD as a separate layer. Performance is due to hole "self sealing" and is not a viable approach
***Although the process made a very rubbery n-TD gel, it failed the F/T test

TABLE 3

SUMMARY of DSC Results: Liquid n-TD vs. Gelled (5% wt Kraton™ G1654) n-TD

| Sample Description (Lot#, Number of Samples Tested) | AVG Onset (thaw) (Deg C.) | AVG PEAK (thaw) (Deg C.) | AVG LH (thaw) (J/g) |
|---|---|---|---|
| 98%+ Pure n-TD (Lot# 20120301), (n = 2): | 4.8 | 6.0 | 225.4 |
| 5% Gelled n-TD (Lot# 20120301) (n = 3): | 3.8 | 8.2 | 213.5 |

COMPARATIVE EXAMPLE 1

Gel Comprising n-tetradecane and "Gelled" PLUSICE A4 Rubber from PCM Products

A sample of "Gelled" PLUSICE A4 (organic PCM) Rubber was obtained from PCM Products (Hertfordshire, UK). The sample was rotary evaporated such that only (solid) gelling agent remained. 5% wt of the solid gelling agent was fully dissolved in n-tetradecane, using the setup described in Example 1, at elevated temperatures (75° C.+), to make a homogeneous solution (no transition temperature was found). After cooling to room temperature, the resulting gel was an opaque rubbery solid. The opaque solid was subjected to the 10 cycle freeze/thaw test (as described in Example 5). After being subjected to the freeze/thaw test, the 5% wt "gelled" PLUSICE A4 Rubber showed a sizeable volume of liquid n-tetradecane separated from the starting material (i.e., the material failed the freeze/thaw test).

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A method of preparing a gel, the method comprising the steps of:
   (a) providing a phase-change material, wherein the phase-change material comprises at least one organic phase-change material selected from the group consisting of n-alkanes;
   (b) providing a gelling agent, wherein the gelling agent comprises at least one saturated olefin rubber and wherein the gelling agent constitutes up to about 10%, by weight, of the gel;
   (c) mixing together the phase-change material and the gelling agent at a temperature above room temperature, below the flashpoint of the phase-change material and not exceeding 90° C. to partially, but not completely, dissolve the gelling agent, whereby a non-homogeneous mixture is produced; and
   (d) allowing the non-homogeneous mixture to cool to room temperature.

2. The method as claimed in claim 1 wherein the at least one organic phase-change material is selected from the group consisting of n-tetradecane, n-hexadecane, n-octadecane, and mixtures thereof.

3. The method as claimed in claim 1 wherein the gelling agent is at least one hydrogenated styrenic block copolymer.

4. The method as claimed in claim 3 wherein the gelling agent is at least one styrene-ethylene-butylene-styrene tri-block copolymer.

5. The method as claimed in claim 4 wherein the gelling agent is at least one high molecular weight styrene-ethylene-butylene-styrene tri-block copolymer with a styrene:rubber ratio in the range of about 30:70 to 33:67 by weight.

6. The method as claimed in claim 1 wherein the gelling agent is selected from the group consisting of a styrene-ethylene-butylene-styrene tri-block copolymer and a styrene-ethylene-propylene-styrene tri-block copolymer.

7. A method of preparing a gel, the method comprising the steps of:
   (a) providing a phase-change material, wherein the phase-change material comprises at least one organic phase-change material, wherein the at least one organic phase-change material is n-tetradecane;
   (b) providing a gelling agent, wherein the gelling agent comprises at least one saturated olefin rubber and wherein the gelling agent constitutes up to about 10%, by weight, of the gel;
   (c) mixing together the phase-change material and the gelling agent at a temperature above room temperature, below the flashpoint of the phase-change material and not exceeding 90° C. to partially, but not completely, dissolve the gelling agent, whereby a non-homogeneous mixture is produced; and (d) allowing the non-homogeneous mixture to cool to room temperature.

8. A method of preparing a gel, the method comprising the steps of:
(a) providing a phase-change material, wherein the phase-change material comprises at least one organic phase-change material, wherein the at least one organic phase-change material is n-tetradecane;
(b) providing a gelling agent, wherein the gelling agent comprises at least one saturated olefin rubber, wherein the gelling agent constitutes up to about 10%, by weight, of the gel, and wherein the gelling agent is a high molecular weight styrene-ethylene-butylene-styrene tri-block copolymer with a styrene:rubber ratio in the range of about 30:70 to 33:67 by weight;
(c) mixing together the phase-change material and the gelling agent at a temperature above room temperature but below the flashpoint of the phase-change material to partially, but not completely, dissolve the gelling agent, whereby a non-homogeneous mixture is produced; and
(d) allowing the non-homogeneous mixture to cool to room temperature.

9. A method of preparing a gel, the method comprising the steps of:
(a) providing a phase-change material, wherein the phase-change material is n-tetradecane;
(b) providing a gelling agent, wherein the gelling agent is a high molecular weight styrene-ethylene-butylene-styrene tri-block copolymer with a styrene:rubber ratio in the range of about 30:70 to 33:67 by weight and wherein the gelling agent constitutes up to about 10%, by weight, of the gel, with the phase-change material constituting the remainder of the gel;
(c) mixing together the phase-change material and the gelling agent at a temperature above room temperature but below the flashpoint of the phase-change material to partially, but not completely, dissolve the gelling agent, whereby a non-homogeneous mixture is produced; and
(d) allowing the non-homogeneous mixture to cool to room temperature.

10. The method as claimed in claim 9 wherein the gelling agent constitutes less than 6%, by weight, of the gel, with the phase-change material constituting the remainder of the gel.

11. The method as claimed in claim 10 wherein the temperature at which the phase-change material and the gelling agent are mixed together is in the range of about 40° C. to about 55° C.

12. A method of preparing a gel, the method comprising the steps of:
(a) providing a phase-change material;
(b) providing a gelling agent, wherein the gelling agent is at least one styrene-ethylene-propylene-styrene tri-block copolymer;
(c) mixing together the phase-change material and the gelling agent at a temperature above room temperature but below the flashpoint of the phase-change material to partially, but not completely, dissolve the gelling agent, whereby a non-homogeneous mixture is produced; and
(d) allowing the non-homogeneous mixture to cool to room temperature.

13. The method as claimed in claim 12 wherein the gelling agent is at least one high molecular weight styrene-ethylene-propylene-styrene tri-block copolymer with a styrene:rubber ratio of about 20:80 by weight.

14. A method of preparing a gel, the method comprising the steps of:
(a) providing a phase-change material, wherein the phase-change material comprises at least one organic phase-change material selected from the group consisting of n-alkanes;
(b) providing a gelling agent, wherein the gelling agent comprises at least one saturated olefin rubber and wherein the gelling agent constitutes less than 6% by weight of the gel;
(c) mixing together the phase-change material and the gelling agent at a temperature above room temperature but below the flashpoint of the phase-change material to partially, but not completely, dissolve the gelling agent, whereby a non-homogeneous mixture is produced; and
(d) allowing the non-homogeneous mixture to cool to room temperature.

15. A method of preparing a gel, the method comprising the steps of:
(a) providing a phase-change material, wherein the phase-change material is at least one n-alkane;
(b) providing a gelling agent, wherein the gelling agent is selected from the group consisting of a styrene-ethylene-butylene-styrene tri-block copolymer and a styrene-ethylene-propylene-styrene tri-block copolymer and wherein the gelling agent constitutes up to about 10%, by weight, of the gel;
(c) mixing together the phase-change material and the gelling agent at a temperature above room temperature but below the flashpoint of the phase-change material to partially, but not completely, dissolve the gelling agent, whereby a non-homogeneous mixture is produced, wherein the temperature at which the phase-change material and the gelling agent are mixed together is in the range of about 40° C. to about 55° C.; and
(d) allowing the non-homogenous mixture to cool to room temperature.

* * * * *